US006351237B1

(12) United States Patent
Martek et al.

(10) Patent No.: US 6,351,237 B1
(45) Date of Patent: Feb. 26, 2002

(54) POLARIZATION AND ANGULAR DIVERSITY AMONG ANTENNA BEAMS

(75) Inventors: Gary A. Martek, Edgewood; Sheldon K. Meredith, Duvall; Douglas O. Reudink, Kirkland; Mark Reudink, Seattle; Martin J. Feuerstein, Redmond, all of WA (US)

(73) Assignee: Metawave Communications Corporation, Redmond, WA (US)

( * ) Notice: Subject to any disclaimer, the term of this patent is extended or adjusted under 35 U.S.C. 154(b) by 0 days.

(21) Appl. No.: 09/450,318

(22) Filed: Nov. 29, 1999

Related U.S. Application Data

(63) Continuation-in-part of application No. 08/923,051, filed on Sep. 3, 1997, now Pat. No. 6,005,516, which is a continuation-in-part of application No. 08/726,277, filed on Oct. 4, 1996, now Pat. No. 5,757,318, which is a continuation of application No. 08/488,793, filed on Jun. 8, 1995, now Pat. No. 5,563,610.

(51) Int. Cl.$^7$ ........................ H01Q 21/06; H01Q 21/24; H04B 7/10
(52) U.S. Cl. ........................ 342/361; 342/362; 342/363; 342/365
(58) Field of Search ................................ 342/361, 362, 342/363, 364, 365, 366

(56) References Cited

U.S. PATENT DOCUMENTS

| 4,701,935 A | | 10/1987 | Namiki | 375/4 |
| 5,280,472 A | | 1/1994 | Gilhousen et al. | 370/18 |
| 5,347,535 A | | 9/1994 | Karasawa et al. | 375/1 |
| 5,459,873 A | | 10/1995 | Moore et al. | 455/277.1 |
| 5,530,926 A | | 6/1996 | Rozanski | 455/277.2 |
| 5,596,333 A | | 1/1997 | Bruckert | 342/457 |
| 6,094,165 A | * | 7/2000 | Smith | 342/373 |
| 6,144,339 A | * | 11/2000 | Matsumoto et al. | 342/361 |

FOREIGN PATENT DOCUMENTS

| GB | 2310109 A | 8/1997 | ............ H04B/7/02 |
| GB | 2325819 A | 12/1998 | ............ H04B/7/08 |

OTHER PUBLICATIONS

PCT International Search Report (PCT/US00/31419) dated Apr. 5, 2001.
Dennis A. Jiraud; "Broadband CDMA for Wireless Communications"; Applied Microwave & Wireless; pp. 22–34.
CDMA Network Engineering Handbook; Draft Version XI; Chapter 2; pp. 2–1 thru 2–12.

* cited by examiner

Primary Examiner—Theodore M. Blum
(74) Attorney, Agent, or Firm—Fulbright & Jaworski L.L.P.

(57) ABSTRACT

A receiving system 100 is disclosed which includes at least one antenna 101 providing a plurality of antenna beams providing signal diversity between communicated signals. A first processing branch 103 is included for processing a first plurality of signals appearing within a first plurality of the antenna beams. The first processing branch 103 includes a plurality of signal paths, some of which include delays 105, each receiving a one of the first plurality of signals from a corresponding one of the first plurality of antenna beams. Delays 105 apply a predetermined amount of delay proportionate to the corresponding one of the beams. First processing branch 103 further includes a combiner 106 for combining the first plurality of signals after output from the plurality of signal paths. A second processing branch 104 is provided for processing a second plurality of signals appearing within a second plurality of the antenna beams. Second processing branch 104 includes a plurality of signal paths, some of which include delays 105, each receiving one of the second plurality of signals from a corresponding one of the second plurality of antenna beams. Delays 105 applying a pre-selected amount of delay to the corresponding one of the beams. Second processing branch 104 further includes a combiner 106 for combining the second plurality of signals after output from the plurality of signal paths. Finally, a radio 102 is provided having a first port coupled to an output of first processing branch 103 and a second port coupled to a second processing branch 104.

50 Claims, 8 Drawing Sheets

POLARIZATION AND ANGULAR DIVERSITY AMONG ANTENNA BEAMS

REFERENCE TO RELATED APPLICATION

The present application is a continuation-in-part of and commonly assigned U.S. application Ser. No. 08/923,051, entitled "DIVERSITY AMONG NARROW ANTENNA BEAMS," filed Sep. 3, 1997, now issued as U.S. Pat. No. 6,005,516, which application is itself is a continuation-in-part of and commonly assigned U.S. application Ser. No. 08/726,277, entitled "NARROW BEAM WIRELESS SYSTEMS WITH ANGULARLY DIVERSE ANTENNAS," filed Oct. 4, 1996, now issued as U.S. Pat. No. 5,757,318, which application is itself a continuation of commonly assigned U.S. application Ser. No. 08/488,793, entitled "NARROW BEAM ANTENNA SYSTEMS WITH ANGULAR DIVERSITY," filed Jun. 8, 1995, now issued as U.S. Pat. No. 5,563,610, each of which are hereby incorporated by reference herein.

The present application is also related to copending, commonly assigned, U.S. application Ser. No. 08/520,316, entitled "NARROW BEAM ANTENNA SYSTEMS WITH ANGULAR DIVERSITY," now issued as U.S. Pat. No. 5,563,610, and U.S. application Ser. No. 09/229,492, entitled "INDOOR DISTRIBUTED MICROCELL," filed Jan. 11, 1999, each of which are hereby incorporated by reference herein.

TECHNICAL FIELD

The present invention relates in general to wireless communications systems and in particular to apparatus, systems and methods for providing signal diversity utilizing multiple antenna beams in such systems.

BACKGROUND

The performance of wireless communications systems, including analogue, time division multiple access (TDMA), frequency division multiple access (FDMA) and code division multiple access (CDMA) systems, is adversely affected by interference. One source of interference at the base station is caused by the simultaneous receipt of signals from multiple remote (mobile) units, and in particular when those mobile units are broadcasting on the same frequency. Assuming an ideal antenna and signal propagation conditions, and that the base station is receiving signals of substantially the same power (in CDMA) from each of the mobile units, the level of interference noise is directly proportional to the number of mobile unit signals received at the base station antenna. This problem is compounded when a mobile unit closer to the base station masks the signals received from mobile units a farther distant.

Another type of interference which adversely affects wireless communications systems is caused by multipath effects. In this case, the signal broadcast from a given mobile unit will reflect off various objects in the surrounding environment. As a result, multiple reflected signals taking multiple paths of varying path lengths arrive at the receiver. These multipath components (reflections) arrive at the receiver antenna with varying time delays (phase differences), and depending on the corresponding path lengths, may combine to produce fades in signal strength. In the worst case where multipath signals are received one-half wavelength out of phase, a null can occur due to signal cancellation.

By minimizing interference in the link from the mobile unit to base station the ability to extract data from that signal is improved (i.e. an improved bit-error rate is achieved). Further improvement can be achieved if the gain of the receive antenna is increased or the receiver noise figure is decreased. The most substantial improvements in receiver performance occur if interference minimization is achieved in conjunction with an increase in gain.

The use of diverse antenna locations, i.e., spatially diverse antennas, is useful in providing improved signal reception at receivers, such as the above mentioned TDMA, FDMA, and CDMA receiving systems. For example, analogue advanced mobile phone service (AMPS) and digital advanced mobile phone service (DAMPS) receivers may employ spatially diverse antennas in the receive signal path to provide improved reception of signals. In one such configuration, the receiver receives data from three 120° sectors, together providing 360° coverage. Each 120° sector is covered by two 120° antennas with identical views, one antenna feeding the receiver main (or diversity 1) port and the other feeding the receiver diversity (or diversity 2) port. Alternatively, omni-directional antennas may be used to feed a receiver having only a sector and a diversity port. The antennas are typically separated by a predetermined number of wavelengths in order to provide spatial diversity. This spatial diversity ensures that the incoming multipath components from a given mobile unit transmission are substantially uncorrelated.

If the number of required antennas could be reduced, and/or the need to space antennas by substantial distances could be eliminated, a more compact and less complicated base station could be built. Further, if in doing so, interference reduction and gain improvement could also be achieved, the receiver operation could simultaneously be improved.

In sum, the need exists for improved apparatus, systems and methods for receiving signals in a wireless communications system. Such apparatus, systems and methods should reduce interference power and improve receiver gain.

SUMMARY OF THE INVENTION

The principles of the present invention allow for multiple antenna beams to be used to feed a smaller number of receiver input ports. Such multiple beams may be provided by a multibeam antenna (or antennas) and/or a plurality of co-located discreet antennas. By using multiple, narrow, beams to focus on selected mobile units, interference can be substantially reduced and antenna gain substantially increased. Similarly, using polarized beams, interference can be substantially reduced through the use of a beam polarized for selected mobile units and/or through the use of combining of alternately polarized antenna beams in order to minimize or avoid destructive combining of received signals. Systems embodying the principles of the present invention can be advantageously applied to wireless communication systems, such as cellular telephone systems and personal communication services (PCS), although such principles are not necessarily limited to these applications.

According to a first embodiment of the present invention, a communication system is provided which includes at least one antenna providing a plurality of antenna beams, ones of which are alternately or differently polarized. Ones of these antenna beams are combined for coupling to a radio, such as a voice receiver radio, or other equipment in order to allow for forming or synthesizing sectors of desired widths from the multiple antenna beams, to provide improved signal quality, or the like.

A first processing branch is preferably included for processing a first plurality of signals associated with first selected ones of the antenna beams. The signal paths are each adapted to receive at least one of the first plurality of signals associated with corresponding ones of the first antenna beams. The first processing branch also preferably includes a combiner for combining the first plurality of signals for coupling to an interface of the radio or other equipment.

A second processing branch is also preferably provided for processing a second plurality of signals associated with second selected ones of the antenna beams. The signal paths are each adapted receive at least one of the second plurality of signals associated with corresponding ones of the second antenna beams. A combiner is also preferably provided for combining the second plurality of signals for coupling to another interface of the radio or other equipment.

In order to better provide combining of uncorrelated signals and, thus, to avoid destructive combining of signals by either of the first and second processing branches, the antenna beams combined in both the first processing branch and the second processing branch are preferably alternately polarized. For example, where the first processing branch combines the signals of four contiguous antenna beams to form a sector of a desired width, a first and third non-adjacent antenna beam to be combined by the first processing branch are each associated with antennas having a first polarization, and a second and fourth non-adjacent antenna beam to be combined by the first processing branch are each associated with antennas having a second polarization. Accordingly, utilizing both angular and polarization diversity, signal orthogonality may be optimized to avoid destructive combining as those antenna beams having a least amount of angular diversity (low order directional orthogonality) are combined having the benefit of polarization diversity (high order polarization orthogonality).

The first and/or second processing branch may include additional circuitry to further decorrelate signals to be combined, such as delays associated with ones of the plurality of signal paths. However, the above described combining of the various antenna beam signals in each processing branch according to the preferred embodiment provides sufficiently orthogonal signals that such delays are not necessary.

It shall be appreciated that the above described interfaces of the radio or other equipment may be interfaces each associated with a different communication or overhead channel, such as a frequency division channel, time division channel, or code division channel. Alternatively, the above described interfaces may be related interfaces, such as a sector and diversity input, associated with a same channel.

The above described alternately polarized antenna beams may be provided by a number of antenna beam arrangements, such as might be provided by an antenna structure adapted to provide substantially non-overlapping antenna beams throughout a desired area of coverage, ones of which being provided with differing polarization. However, a preferred embodiment of the present invention utilizes an antenna structure to provide antenna beams which substantially overlap. For example, according to a preferred embodiment of the present invention, a first set of substantially non-overlapping antenna beams having a first polarization may be provided and a second set of substantially non-overlapping antenna beams having a second polarization may be provided which overlap the first set of antenna beams. According to this preferred embodiment, communications within any particular portion of the area served or illuminated by the antenna structure may be served at least by two antenna beams of varying polarization.

Preferably, the antenna structure includes collocated sets of alternately polarized antenna elements to provide dual polarization in a physical configuration substantially consistent with that of a singularly polarized antenna. Accordingly, the physical aperture, and thus its aesthetic qualities as well as other physical considerations, such as wind loading, remain substantially unaffected as between a polarization diverse antenna of this preferred embodiment and a singularly polarized multibeam antenna of the prior art.

The principles of the present invention provide substantial advantages over the prior art. In particular, multiple antennas or antenna beams may be connected to a receiver which has a number of input ports less than the number of antennas desired. Further, according to the present invention, narrow beam antennas may be used with a receiver to substantially reduce interference and provide increased antenna gain. Further, antennas constructed in accordance with the principles of the present invention do not require substantial, or even precise, spacing between antennas or antenna beam phase centers, as is required in prior art antenna systems to ensure that incoming signals are uncorrelated or do not destructively combine.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION

The principles of the present invention and their advantages are best understood by referring to the illustrated embodiment depicted in FIGS. 1–8 of the drawings, in which like numbers designate like parts.

Figure 9:
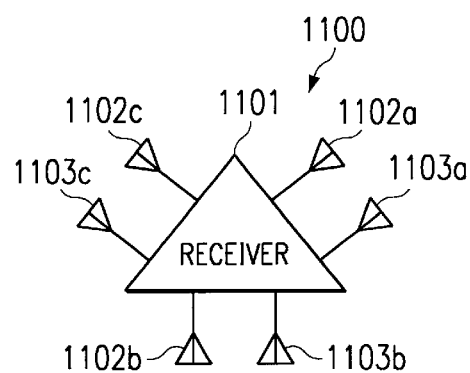
FIG. 9 is a functional block diagram of a prior art CDMA receiving system.

FIG. 9 is a general block diagram of a prior art base station configuration 1100 typically used in presently available wireless communications systems, such as cellular telephone systems. In the conventional system of FIG. 9 receiver 1101 receives signals from three "faces," each of which covers a 120° sector. Each sector is concurrently covered by two antennas: a sector antenna 1102 with a 120° field of coverage and diversity antenna 1103, also with a field of coverage of 120°. The sector antenna 1102 and diversity antenna 1103 for each face is physically spaced by a range of approximately 10 to 20 times the wavelength of the received signal. In current cellular telephone systems, this equates to approximately 10 to 20 feet. While further separation would be desirable to insure that the incoming signals are uncorrelated, increased separation is typically impractical due to space limitations.

Figure 1:
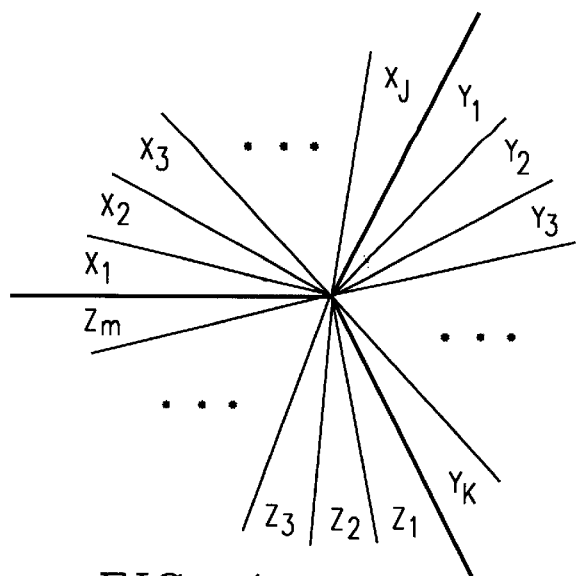
FIG. 1 is a beam diagram depicting one possible distribution of antenna beams according to the principles of the present invention.

Directing attention to FIG. 1, it should be appreciated that multiple narrow antenna beams may be utilized to provide communication within a 360° service area similar to that provided by the system of FIG. 9. For example, antenna beams X1–Xj, Y1–Yk, and Z1–Zm may be utilized to provide communication in 120° portions of the service area corresponding to that of antennas 1102a and 1103a, 1102b and 1103b, and 1102c and 1103c respectively. The variables j, k, and m are preferably each equal to a same value N, although differing numbers of antenna beams may be utilized according to the present invention.

Figure 2:
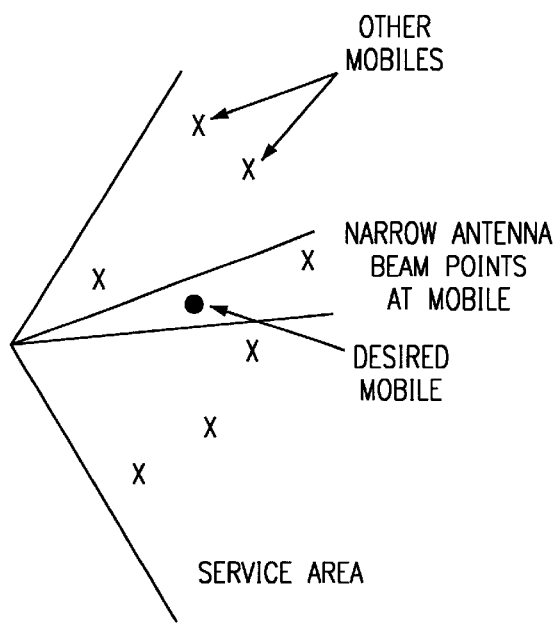
FIG. 2 is a diagrammatic illustration of the operation of the system of the present invention.

By employing narrow multiple beams instead of the wide single beams used in present systems, substantial performance improvement is achieved. First, since narrow beams are more highly directional, focus on the signal from a desired mobile in a wireless communications system can be made to the exclusion of signals from other mobiles operating in the same sector. This focusing is preferably done on the basis of the mobile user's assigned identification code, SAT tone or other unique identification information. This feature reduces the interference from undesired mobiles. An example is shown in FIG. 2 where eight mobile units are operating in the sector with the base station attempting to receive a single mobile (based on the users identification code). Six of the other mobiles are excluded as being outside the beam coverage of the narrow beam directed at the desired mobile; noise from direct signals is thereby reduced from 7noise units to 1.

Similarly, beams utilizing different polarization to focus on the signal from a desired mobile can be utilized to exclude signals from other mobiles operating in the same sector. For example, users of hand held mobiles very rarely hold the mobile unit antenna vertically, and instead typically cock the unit at approximately 45 degrees, whereas mobiles mounted in vehicles typically utilize a vertically mounted antenna. As a result, beams polarized differently, i.e., vertical and horizontal, slant left and slant right, and/or left circular and right circular, may be used to focus on a desired mobile unit. As described above, this focusing is preferably done on the basis of the mobile user's assigned identification code or other unique information. This feature reduces the interference from undesired mobiles polarized differently than the desired mobile, as their signal component in the cross-polarization direction is removed by selecting only a cross polarized beam.

In addition to reducing interference by excluding undesired mobiles, narrower beams generally provide higher gain. Higher gain allows the mobiles to transmit with less power or operate over longer paths (separations from the base station) with the same power. Finally, the multibeam approach, whether providing angular or polarization diversity, is advantageously compact as signal diversity does not depend on separation of the beam sources.

As discussed above, substantial spacing is not required to maintain signal separation with the present invention. Beams (from either a multiple-beam antenna or a plurality of discrete antennas) may provide signal diversity through the use of, for example, antennas with angular diversity, spatial diversity, polarization diversity, or any combination thereof. To provide angular diversity, beams are adapted to provide different angular coverage (i.e., each beam has a different azimuthal view). Since each beam is viewing a different phase front, the signals received by such beams are uncorrelated.

Polarization diversity is accomplished by adapting beams to provide differing polarization. Since beams of each polarization are responsive only to radiated signals having a matching polarization component, the signals received by the beams may be uncorrelated.

It should be noted that polarized antenna beams may improve performance other than by their utilization to provide uncorrelated signals. As discussed above, users of hand held mobiles very rarely hold the mobile unit antenna vertically, such that the polarization of the mobile unit antenna matches that of the base station. Likewise, reflected signals providing a received signal straight suitable for use in communication, may be polarized differently than either the mobile unit or the base station antennas. As a result, the component in the cross-polarization direction is lost at the base station. Additionally, the use of polarized antenna beams may also improve performance through allowing the combining of antenna beams, such as to provide synthesized sector patterns, increase antenna aperture with respect to particular mobile units, or improve signal to noise characteristics, without unexpectedly destructively and beneficially combining due to a particular phase relationship of the signal as among the combined beams.

Antenna 101 adapted to provide polarization diversity is shown in FIG. 4 having differently polarized overlapping beams. Accordingly, the polarization of a second antenna is preferably orthogonal (or at least offset) from the polarization of a first antenna. For example, the first and second antennas may be right hand and left hand polarized or horizontally and vertically polarized, respectively. With such an arrangement, the signal component in the cross-polarization direction may now be received by a cross-polarized second antenna, thus improving signal reception by receiving a signal component previously not available and by allowing adjacent antenna beams which are alternately polarized to be summed without destructively combining. In the system illustrated in FIG. 3 alternating beams are each polarized differently. For example, beams 1 and 2, shown overlapping, may provide radiation pattern 402 with right hand and left hand polarization respectively. Similarly, beams N–1 and N, also shown overlapping, may provide radiation pattern 403 with right hand and left hand polarization respectively.

Of course, alternative arrangements providing antenna beams of different polarizations may be utilized according to the present invention, if desired. For example, antenna 101 may be constructed from a plurality of polarized multibeam antennas whose patterns overlap such that the cross-over from one pattern is at the peak of another.

It shall be appreciated that use of overlapping beams requires either less narrow beam widths or additional beams to provide the same azimuthal coverage as the angularly diverse system described above. For example, where four 30° substantially non-overlapping beams provide 120° coverage, four 60° overlapping beams provide 120° coverage with the antenna of FIG. 3.

Figure 3:
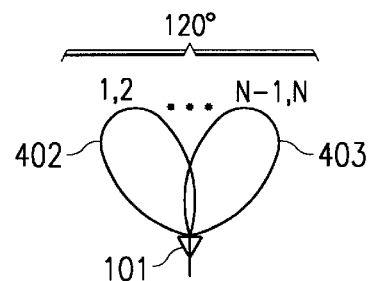
FIG. 3 illustrates overlapping beams providing polarization diversity.

It shall be appreciated that, although the embodiment of FIG. 3 has been discussed with respect to polarization diversity alone, the embodiment illustrated also provides angular diversity as well. Angular diversity is provided by the multiple narrow beams disposed for different azimuthal coverage within the sector.

Of course, consistent with the principles of the present invention, more than four beams per sector may be utilized. In fact a preferred embodiment of the present invention, as is described with respect to FIG. 4B below, utilizes a first set of antenna elements polarized in a first orientation, such as vertical, and coupled to a first beam forming matrix, such as a Butler matrix well known in the art, to provide four substantially non-overlapping antenna beams of a sector face. A second set of antenna elements polarized in a second orientation, such as horizontal, are substantially collocated with the first set of antenna elements. The second set of antenna elements are coupled to a second beam forming matrix also providing four substantially non-overlapping antenna beams of a sector face. However, according to this preferred embodiment of the present invention, the antenna beams of the first antenna set and the second antenna set overlap such that eight antenna beams are provided substantially as shown in FIG. 3, thus doubling the number of antenna beams available. Of course, partially overlapping beams, rather than the fully overlapping antenna beams of FIG. 3, may be utilized by the present invention to provide polarization diversity, if desired.

Figure 4A:
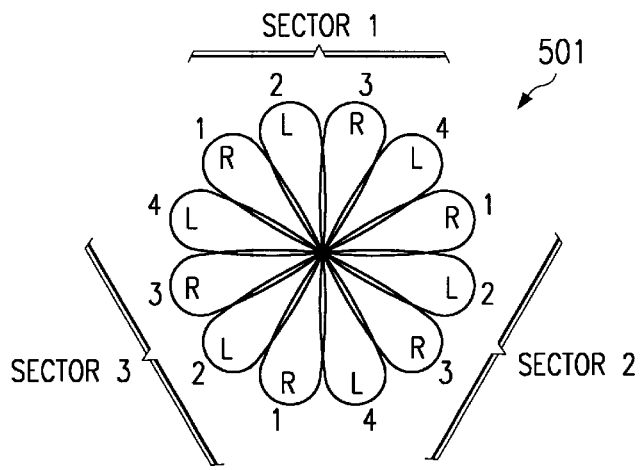
FIGS. 4A–4B illustrate alternative embodiments of the multiple beams of the present invention.
Figure 4B:
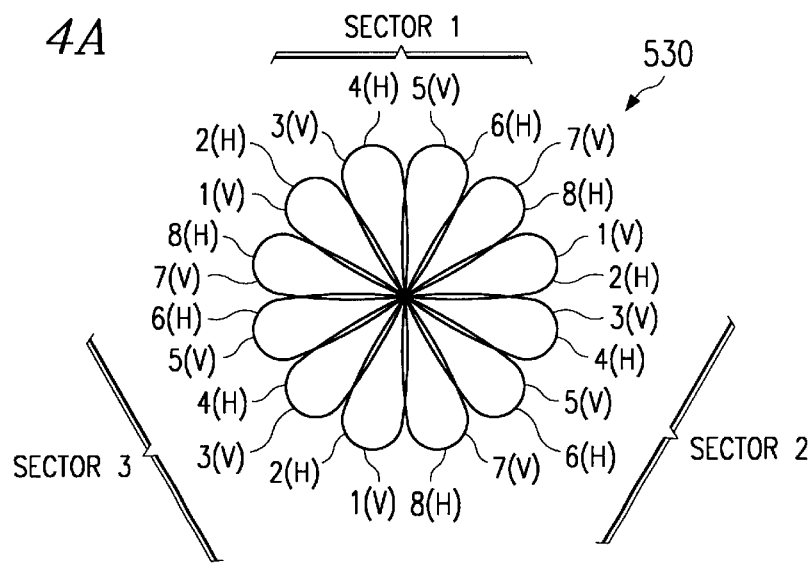

Directing attention to FIGS. 4A through 4B, various combinations of the aforementioned signal diversity methods are shown as being implemented in a three sectored cell. FIG. 4A shows an alternative embodiment providing angular diversity in combination with polarization diversity as antenna system 501. It shall be understood that the beams of each sector may be provided as discussed above with respect to antenna 101. Here non-overlapping antenna beams 1 through 4 of each sector are adapted to provide both angular diversity and polarization diversity (where L=left polarization and R=right polarization).

FIG. 4B illustrates a preferred embodiment of the present invention wherein antenna beams having orthogonal polarization are overlapped as provided from antenna system 530. Accordingly, each of the three sectors illustrated includes eight antenna beams, four of which (beams 1, 3, 5, and 7 of each sector) are vertically polarized and an overlapping four of which (beams 2, 4, 6, and 8 of each sector) are horizontally polarized.

Figure 5:
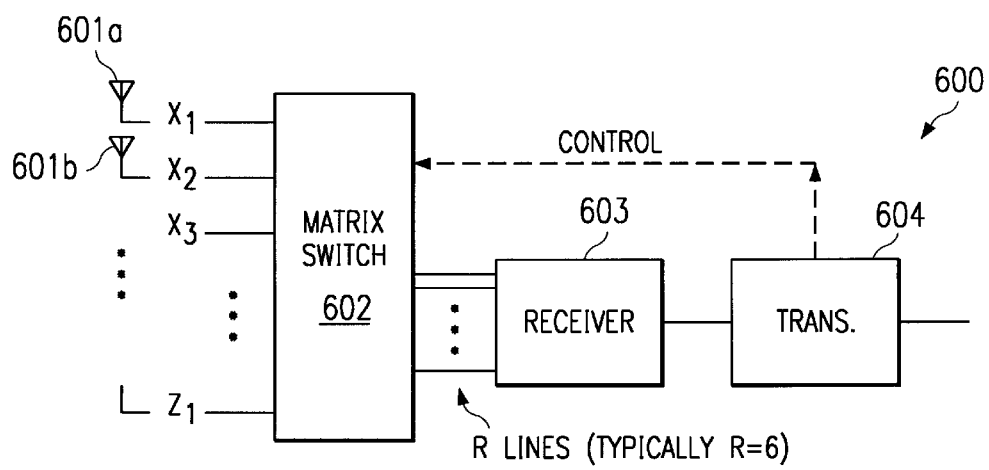
FIG. 5 is a functional block diagram of a receiving system according to the present invention.

An embodiment of circuitry adapted according to the principles of the present invention is depicted in FIG. 5. Receiving system 600 uses a multiple beam antenna structure, shown here as multiple antennas 601, to direct antenna beams to the mobile units. These antennas preferably produce narrow beams, and may be utilized to provide angular, spatial, and/or polarization diversity. In the embodiment of FIG. 5, a matrix switch 602, which may be a portion of a spectrum management unit adapted to selectively couple antenna beam signals with communication equipment interfaces, switches a selected number of antennas to receiver 603. Transmitter 604 is also shown for reference. Assume for discussion purposes that the three face system of FIG. 1 is being implemented.

Assuming for discussion that R=6, R being the number of lines coupling matrix switch 602 and receiver 603, if j=k= m=4, j, k, and m being the number of antenna beams in each sector, then the outputs from two selected antennas per sector are coupled to receiver 603. Preferably, with current receiver technology, only signals from antennas associated with a single sector are provided to a main and diversity input port pair of receiver 603. For example, two antenna beam signals from a first sector may be provided to a first sector main and diversity input port pair of receiver 603 while two antenna beam signals from a second sector are provided to a second sector main and diversity input port pair of receiver 603. Of course, signals associated with different sectors may be provided to the same input port pair of a receiver where it is deemed advantageous, such as when synthesizing sectors of different sizes or orientations.

Receiver 603, or other control circuitry, may automatically select antenna beams providing a most desired attribute, such as the strongest signal with respect to a particular signal, for input into a sector input port of each input port pair of receiver 603. Accordingly, a signal of another antenna beam or beams of the sector, such as antenna beams adjacent to the antenna beams providing the strongest signal, is provided to the diversity input port of the input port pair. Of course, many other combinations are possible.

Finally, assuming j, k, or m is greater than R, then multiple ones of the antenna beam signals may be combined for input into a sector and/or diversity input port of each input port pair of receiver 603. Preferably, where adjacent antenna beam signals are combined for input into a same input port, these adjacent antenna beam signals are associated with antennas having orthogonal or otherwise diverse polarization in order to avoid or minimize undesired effects of summing, such as destructive combining.

It shall be appreciated that the introduction of polarization diversity at a multiple beam base site may increase the number of antenna beams and therefore require additional circuitry and/or special adaption of existing circuitry in order to accommodate the polarization diverse antenna beams. For example, the above described overlapping orthogonally polarized antenna beams of FIG. 4B, such as may be provided using the aforementioned collocated alternately polarized antenna elements, although providing the benefits of substantially 30° narrow antenna beams in combination with the availability of each of the two orthogonal polarizations within any area served by the antenna system, presents a number of antenna beam signals twice that of the antenna systems of FIG. 4A, for example.

Accordingly, a preferred embodiment of the present invention provides such additional circuitry and/or special adaption by making efficient use of communications equipment, such as by utilizing portions of such equipment to serve more than one function. As such the preferred embodiment not only presents a more economical system for deploying mutiply diverse antenna beams, but also allows for retrofitting base sites originally deployed without the benefit of the present invention.

Figure 6A:
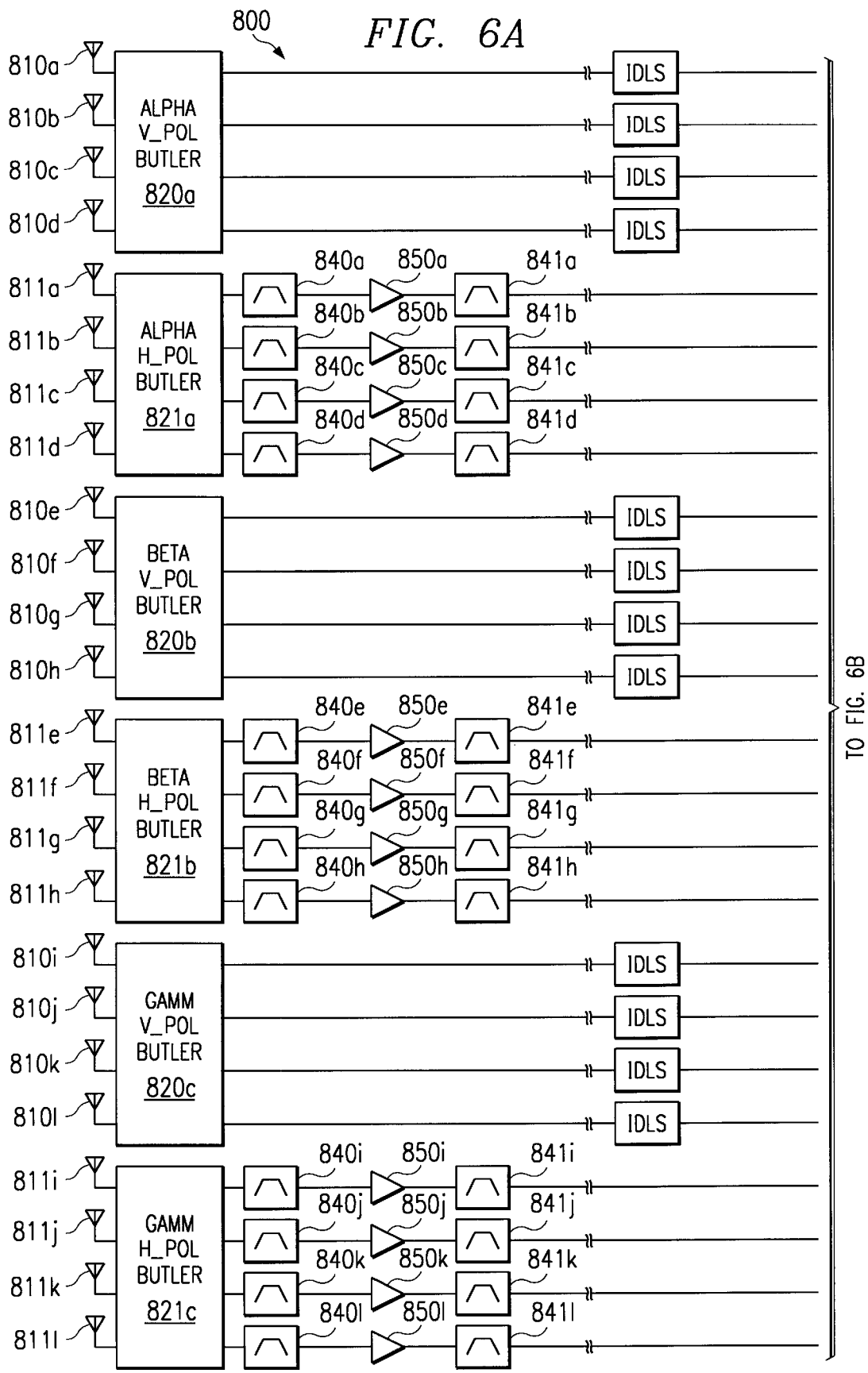
FIGS. 6A and 6B are a functional block diagram of an alternate receiving system according to the present invention.
Figure 6B:
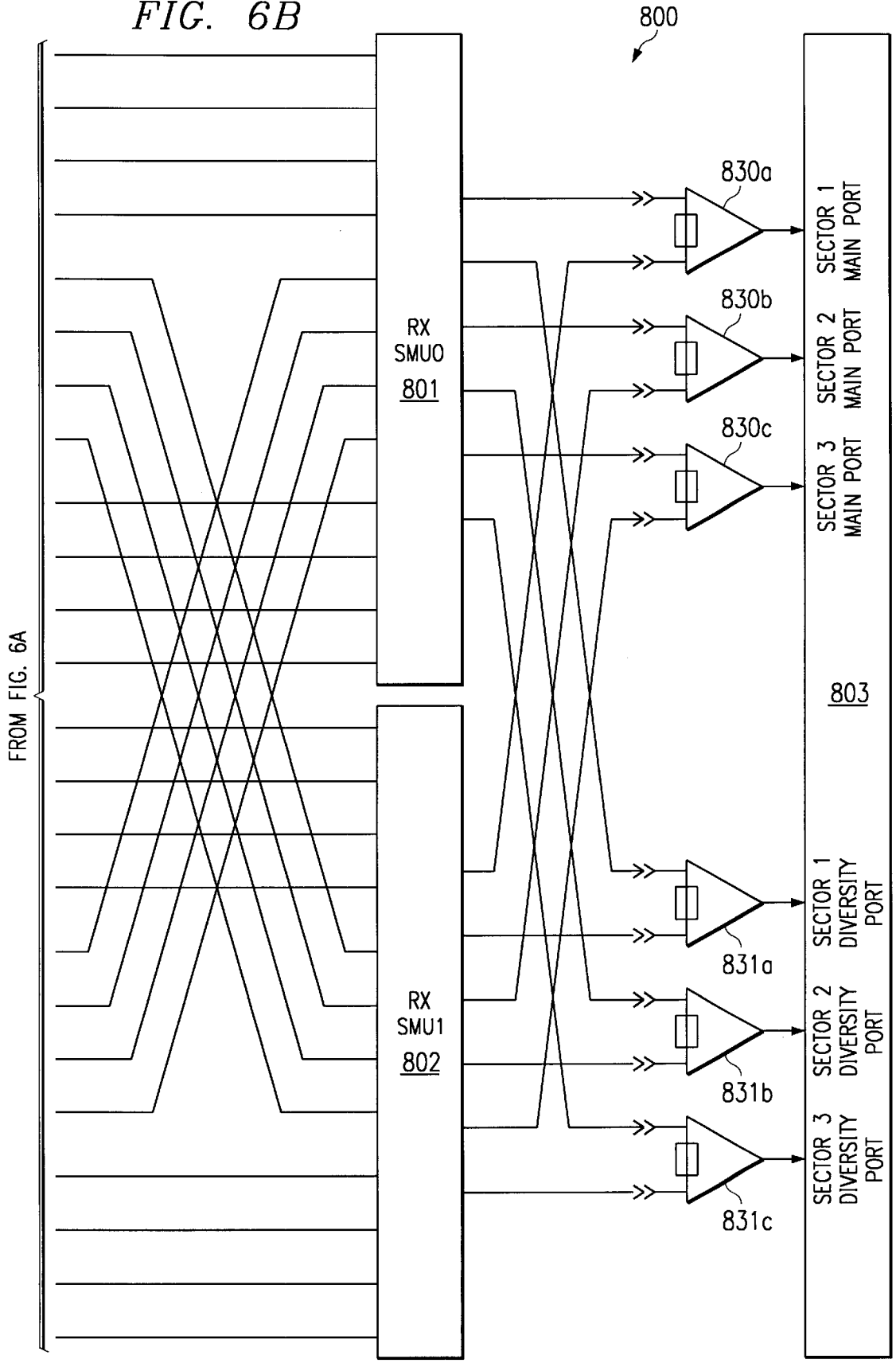

Directing attention to FIGS. 6A and 6B, a preferred embodiment of the present invention adapted so as to efficiently use base station equipment in providing polarization diverse antenna beams overlapping another antenna beam set having a different polarization is shown generally as system 800. It shall be appreciated that antennas 810 are vertically polarized and may be disposed to provide substantially non-overlapping antenna beams substantially as illustrated in FIG. 1. Accordingly, each antenna beam signal, as formed by a corresponding beam forming matrix 820a–820c, is coupled to a first spectrum management unit (SMU) 801. SMU 801 is preferably adapted to provide antenna beam signal monitoring, switching, and combining such that desired combinations of the antenna beams associated with antennas 810 may be selectively coupled to the sector and diversity inputs of a receiver, such as three sector receiver 803. Accordingly, antenna beams having a preferred attribute, such as a strongest signal with respect to a particular mobile unit operating on a channel of a first sector, for example, may be combined and coupled to a sector and/or diversity input of receiver 803 associated with that particular sector. Similarly, multiple ones of the antenna beam signals may be combined for coupling to particular sector inputs in order to form or synthesize a desired sector pattern size and/or orientation (i.e., azimuthal direction).

In order to provide system fault tolerance, a second spectrum management unit (SMU) 802 may be provided as a "hot swap," i.e., fully energized and functional, redundant piece of equipment providing the exact same functionality as SMU 801. SMU 802 may have originally been deployed at a base site having only vertically polarized angularly diverse antenna beams, for example, to standby until such time as SMU 801 exhibits symptoms of malfunction. However, a preferred embodiment of the present invention includes a second set of antennas, antennas 811, polarized in a second orientation, here vertical, substantially collocated with antennas 810. According to this preferred embodiment of the present invention, the antenna beams of the first antenna set and the second antenna set overlap, thus doubling the number of antenna beams available. However, as each horizontally polarized antenna beam signal, as formed by a corresponding beam forming matrix 821a–821c, is coupled to redundant SMU 802, a minimum of additional equipment is required in order to provide polarization diversity according to this preferred embodiment.

The circuitry of SMUs 801 and 802 preferably allow any antenna beam signal of antennas 810 and 811 to be coupled to any input of receiver 803. Accordingly, a great amount of flexibility in providing air link communication with mobiles operable within the area of influence of a base station employing system 800 is provided.

For example, where a sector is to be formed or synthesized which is comprised of multiple contiguous antenna beams, i.e., a sector which is wider than the 30° of a single antenna beam (or 60° of one antenna beam provided to each of a sector and diversity port of a particular sector of receiver 803) is desired, alternating ones of the vertically and horizontally polarized antenna beams may be coupled to a particular port. Specifically, a sector comprised of four antenna beam widths, i.e., a 120° sector comprised of four 30° contiguous antenna beams, may be provided by SMU 801 switching a first and third antenna beam signal of antennas 810a–810d, corresponding to antenna beams 1(V) and 5(V) of sector 1 shown in FIG. 4B, to an input of combiner 830a, and a second and fourth antenna beam signal of antennas 810a–810d, corresponding to antenna beams 3(V) and 7(V) of sector 1 shown in FIG. 4B, to an input of combiner 831a. Simultaneously, SMU 802 may switch a second and fourth antenna beam signal of antennas 811a–811-d, corresponding to antenna beams 4(H) and 8(H) of FIG. 4B, to an input of combiner 830a, and a first and third antenna beam signal of antennas 810a–810d, corresponding to antenna beams 2(H) and 6(H) of sector 1 shown in FIG. 5D, to an input of combiner 831a. Accordingly the sector 1 main input of receiver 803 will be provided signals from four contiguous antenna beams, beams 1(V), 4(H), 5(V), and 8(H), having alternating polarization as among each adjacent antenna beam (vertical, horizontal, vertical, horizontal) while corresponding sector 1 diversity input of receiver 803 will be provided signals from four contiguous antenna beams, beams 2(H), 3(V), 6(H), and 7(V), having alternating polarization as among each adjacent antenna beam (horizontal, vertical, horizontal, vertical).

It shall be appreciated that in combining the antenna beam signals for input into a common port of receiver 803, both angular and polarization diversity are utilized to combine only orthogonal signals. The preferred embodiment of the present invention thus avoids the need for determining a phase relationship of each antenna beam signal to be combined. Specifically, by combining alternating ones of each polarization, the results of angular diversity may be maximized as antenna beam signals possessing a common polarization signal component are offset at least two antenna beams, thereby providing increased angular diversity. Moreover, as antenna beam signals possessing orthogonal polarization signal components are provided to each sector and diversity port pair, the embodiment of FIGS. 6A and 6B provide true polarization diversity at receiver 803.

Furthermore, it should be appreciated that the combining of antenna beam signals according to the present invention is not limited to antenna beams having a same phase center, i.e., beams resulting from a single antenna panel and beam forming matrix combination such as antennas 810a–810d and beam forming matrix 820a and antennas 811a–811d and beam forming matrix 821a (which according to the preferred embodiment described above with respect to collocated alternately polarized antenna elements have substantially a common phase center for all antenna beams). For example a sector could be synthesized by combining antenna beam signals formed from antennas 810a–810d and 811a–811d and antennas 810e–810h and 811e–811h, if desired. As each antenna beam signal is selected to be substantially orthogonal, i.e., polarization diverse and angularly diverse or at least acutely angularly diverse, from another one of the antenna beam signals with which it is combined, exact placement of antenna panels and/or particular phase relationships of their signals is not required according to the present invention.

In the embodiment of FIGS. 6A and 6B, although efficient use has been made of a piece of hot standby equipment in providing the polarization diverse antenna beams, additional signal paths are shown coupling the beam forming matrixes associated with these polarization diverse antenna beams and the switch matrix utilized to couple these signals with the radio equipment. Specifically, in the embodiment of FIGS. 6A and 6B, a total of 24 signal paths are shown to allow selective coupling of any antenna beam signal to any input of receiver 803. In the case of cellular communications, for example, the radio frequencies used are often very high, in the 800–900 MHZ range, and the receive signal strength is often very low, often on the order of milliwatts. Accordingly, low loss transmission cables, which are generally very bulky and expensive, are often used to provide a up/down mast signal path. However, 24 of these cables may be undesired because of the shear bulk or cost of such cables. Accordingly, embodiments of the present invention utilize techniques to provide acceptable signal paths as between the antennas and base station equipment.

Directing attention again to FIGS. 6A and 6B, one preferred technique for reducing the bulk of transmission cables as between the polarization diverse antennas and associated communication equipment is shown. Here bandpass filters 840 and 841 are disposed on either side of low noise amplifiers (LNA) 850. Bandpass filters 840 and 841 are utilized to prevent out of band signals, such as noise and harmonics of the signals of interest, from being passed to or by LNAs 850. LNAs 850 provide amplification of the antenna beam signals to provide an improved signal to noise characteristic with respect to the signals of interest, thus allowing their transmission through less bulky, less costly, and more lossy transmission cables. Through the use of such "tower top" LNAs, it is expected that the deploying of polarization diverse antenna beams as shown in FIGS. 6A and 6B may be accomplished utilizing a number of thin transmission cables which, when bundled, are substantially no larger than a single low loss cable expected to be in service for the remaining antenna beam signals.

Alternative embodiments of the present invention utilize mixing circuitry coupled to an output of selected ones of the antennas for mixing down signals received by those selected antennas. These mixed down signals may then be provided to combining circuitry in order to allow their combining for discrete transmission down mast utilizing a fewer number of cables or other signal paths than might otherwise be possible. For example, directing attention to FIG. 7A, a first preferred embodiment provides for mixing down of antenna beam signals of a first polarization to a first intermediate frequency (IF) for superimposition on the signals of a corresponding antenna beam of a second polarization which is mixed down to a second IF and, thus, the number of discrete transmission cables may be reduced.

Figure 7A:
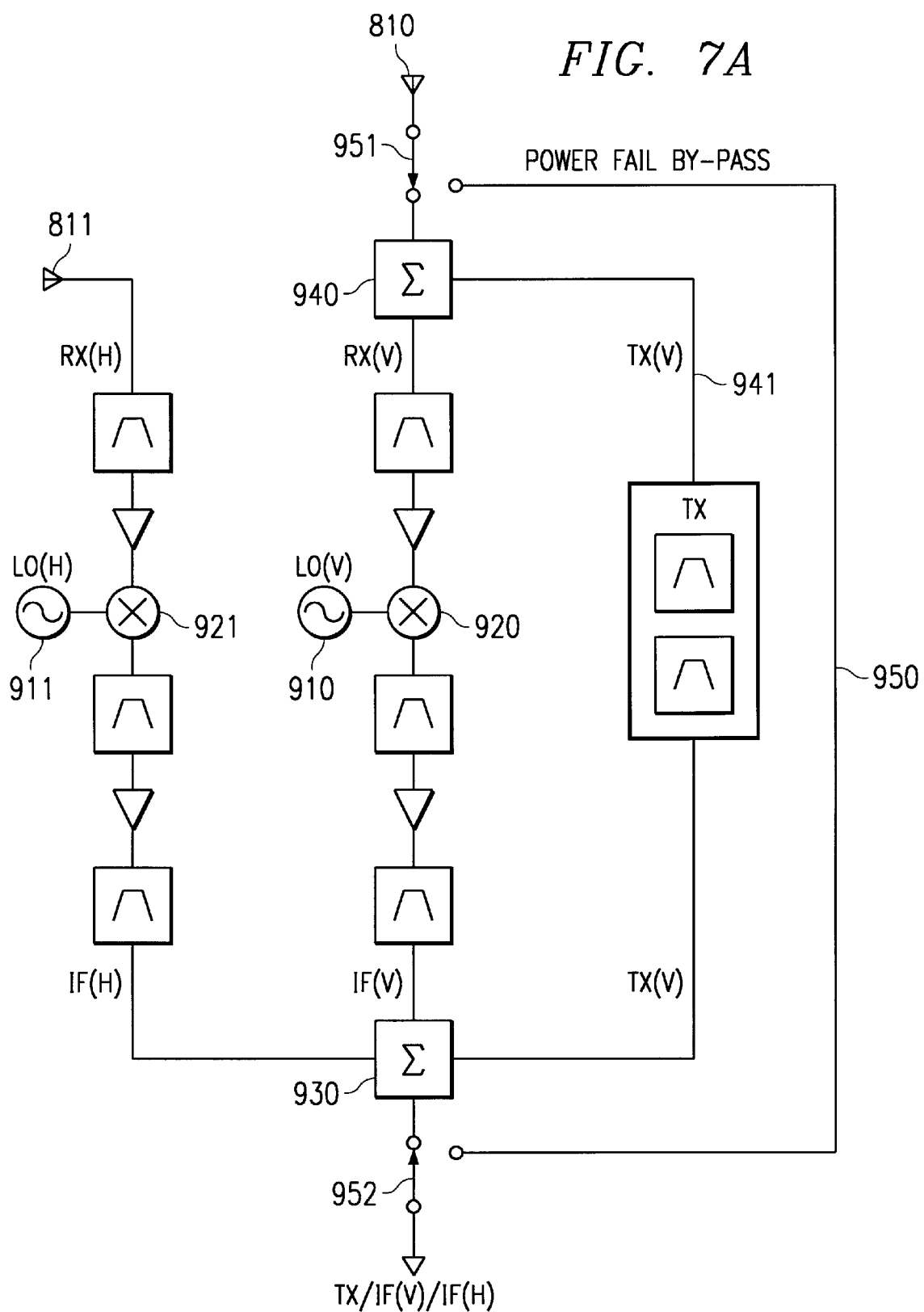
FIGS. 7A–7C and 8 show functional block diagrams of circuitry of the present invention adapted to provide communication of multiple antenna beam signals through a common signal path.

As shown in FIG. 7A, antenna beam signals associated with antennas 811 are coupled to mixer 921 to be mixed with a selected local oscillator (LO) frequency provided by LO 911 to provide an intermediate frequency (IF). The frequency of LO 911 is selected such that the IF resulting from the mixing of the antenna beam signal and the LO frequency is discrete from, and preferably having a guard band there between, an IF or RF combined therewith for transmission through a common signal path. For example in the embodiment illustrated in FIG. 7A, the frequency of LO 911 is selected to provide a different IF than that resulting from the mixing of the LO frequency of LO 910 with the antenna beam signal associated with antenna 810. Accordingly, although summed for transmission to coupled base site equipment by combiner 930, the antenna beam signals associated with antennas 810 and 811 remain discrete.

It should be appreciated that the receive signal paths may include circuitry disposed therein in addition to the aforementioned mixers. For example, as shown in FIG. 7A, various filters and amplifiers may be disposed in the signal paths in order to provide improved signal quality. For example, low noise amplifiers may be disposed in the signal paths both prior to and subsequent to the mixing down of the signals to provide two stage amplification which does not suffer from the problems, such as distortion, associated with amplifying a same frequency multiple times. Similarly, filters may be utilized to discriminate between signals of interest and noise, harmonics, and images.

In the embodiment of FIG. 7A, the antenna beam signal associated with antenna 810 is mixed down by mixer 920 and LO 910 for combining with the antenna beam signal associated with antenna 811. However, it should be appreciated that mixing of one of these antenna beam signals may be omitted if desired, so long as the LO frequency of the other signal, or signals, to be combined therewith is selected so as to remain discrete and recoverable therefrom. Directing attention to FIG. 7B, an alternative preferred embodiment wherein one of the antenna beam signals combined for transmission through a common signal path is not mixed down is shown. According to this embodiment, a single transmission line may be used for each vertical and horizontal pair of overlapping antenna beams shown in FIG. 4B, for example, where the horizontal beam signal is mixed down for combining with the corresponding vertical beam signal for transmission. Therefore, in addition to utilizing a standby switch matrix, such as SMU 802 described above, this embodiment also may utilize the same down mast transmission cables originally deployed for a system not having the benefit of polarization diversity according to the present invention.

It should be appreciated, however, that there may be advantages realized in the mixing down of multiple ones of the antenna beam signals to be combined. For example, by selecting the various LO frequencies properly, a single down mast transmission cable may be utilized for the signal path of a large number, or even all, of the antenna beam signals. Systems and methods for such antenna beam signal combining are described in detail in U.S. Pat. No. 5,859,854 entitled "SYSTEM AND METHOD FOR FREQUENCY MULTIPLEXING ANTENNA SIGNALS", and in the above referenced patent application entitled "INDOOR DISTRIBUTED MICROCELL.".

Figure 7B:
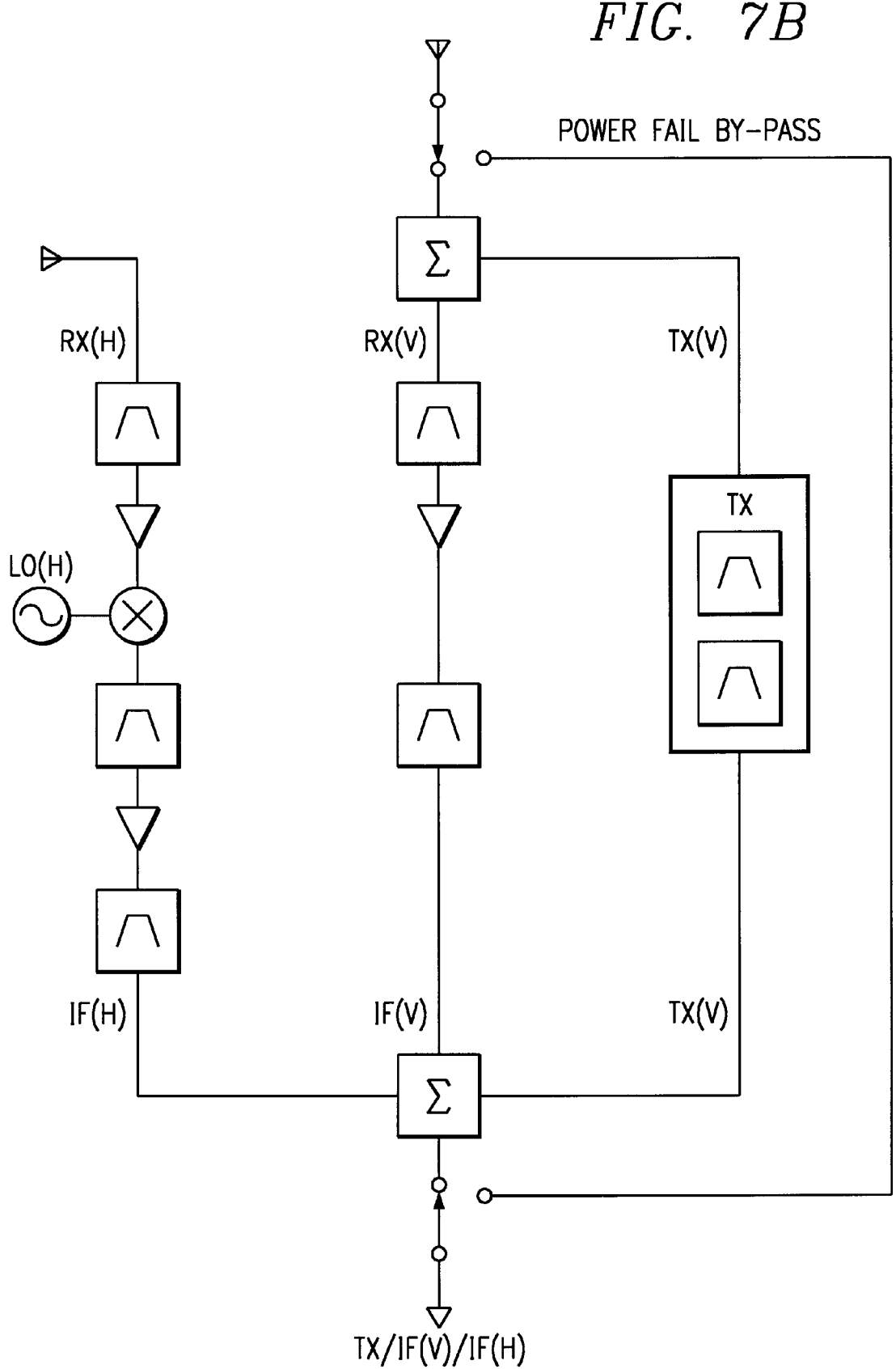
Figure 7C:
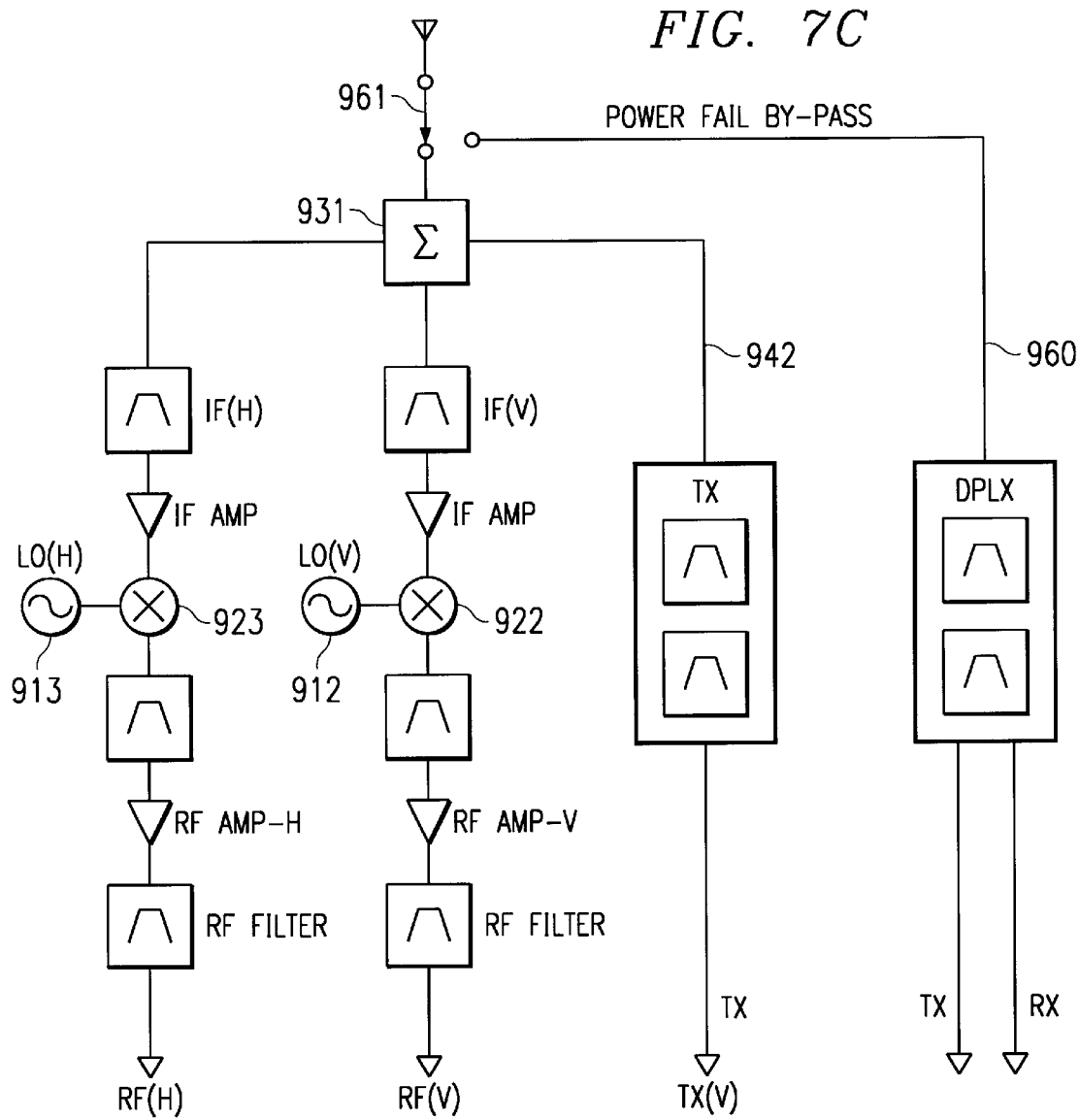

Directing attention to FIG. 7C, base site up mixing circuitry corresponding to the down mixing circuitry of FIG. 7A is shown. Here splitter 931 is provided in the common signal path in order to provide the signal for processing into the discrete signals. LO 912 and 913 are provided in the discrete signal paths associated with antenna beams of antennas 810 and 811 respectively. The frequencies of LO 912 and LO 913 are selected to correspond to those of LO 910 and LO 911 respectively in order to up mix the antenna beam signals to radio frequencies usable by the base site communication equipment. Accordingly, the antenna beam signals, although combined for transmission through a common signal path, may be provided to switch matrixes or other circuitry for selective coupling with receivers substantially as shown in FIGS. 6A and 6B. Preferably filters are included in the signal paths in order to provide only a desired IF for up mixing and/or to remove noise, harmonics, and images.

Shown in FIGS. 7A and 7C are transmit signal paths 941 and 942. These signal paths provide a connection between transmit ports of base site communication equipment and antennas utilized in the forward link. As can be appreciated from the circuitry of FIGS. 7A and 7C, a particular polarization may be selected for use in the forward link, here vertical, thus utilizing polarization diversity in only one direction of the communication link. Splitter/combiner 940 is provided to couple the forward and reverse signal paths to antennas 810. Accordingly, this embodiment of the present invention is adapted for deployment in systems initially not designed for polarization diversity and, thus, having resources to utilize such diversity at only one end of the link. It should be appreciated by one of skill in the art that polarization diversity may be utilized in the forward link in addition to or in the alternative to its use in the reverse link, substantially by replicating and reversing the circuitry shown disposed in the reverse link.

It shall be appreciated that the embodiments of FIGS. 7A–7C employ the use of tower top electronics, i.e., active electronic components are disposed up mast. This is generally a harsh environment subject to damage such as by lightning strike, extreme temperatures, moisture infiltration, and high winds. Accordingly, it is not uncommon for active electronic equipment so disposed to suffer from a higher failure rate than that disposed in the protective confines of a base site radio shack.

Accordingly, the preferred embodiment of the present invention includes adaptation to maintain operability upon failure or malfunction of the tower top electronics associated with the polarization diversity of the present invention. Specifically, bypass signal paths 950 and 960 are provided to allow communications at least through one antenna set, i.e., horizontal or vertically polarized antenna beams. In operation, when a malfunction of the tower top electronics, or even the corresponding base site electronics, is detected, switches 951 and 952 provide a signal path between antennas 810 and the base site equipment which does not include the above mentioned splitting, combining, and mixing circuitry. The down mast transmission cables so utilized may be the same as those relied upon for communicating combined signals, such as where a separate transmission cable is provided for each polarization diverse pair as described above.

As the up mixing circuitry is no longer required upon the routing around the mixing down circuitry, switch 961 at the base site correspondingly provides a signal path between antennas 810 and the base site equipment which does not include the above mentioned splitting and mixing circuitry. It should be appreciated that even upon the above described failure of tower top electronics, the equipment of the present invention may be utilized to provide diverse antenna beam signals, i.e., the angularly diverse antenna beam signals described above. Accordingly, although utilized to add polarization diversity, and the benefits associated therewith, to a system originally adapted for angular diversity, the present invention provides fault tolerance such that even upon a failure of circuitry associated with the signal diversity added according to the present invention, the communication system does not operate below its original design parameters.

The above described fault tolerance carries through to the use of the hot standby equipment as described above. Although putting into service this hot standby equipment, thus rendering it no longer "standby" equipment, a failure of either the primary or secondary piece of equipment still provides operation substantially consistent with original design parameters. For example, if SMU 801 were to fail, although SMU 802 is no longer merely a "standby" switching assembly, it provides redundancy in that an equal number of antenna beams covering a same service area as the antenna beams associated with SMU 801 remain in service. Accordingly, operation of the communication system continues substantially as that of a singularly polarized system with redundant equipment, although the antennas actually in service may have a different polarization than that of the original system design.

Figure 8:
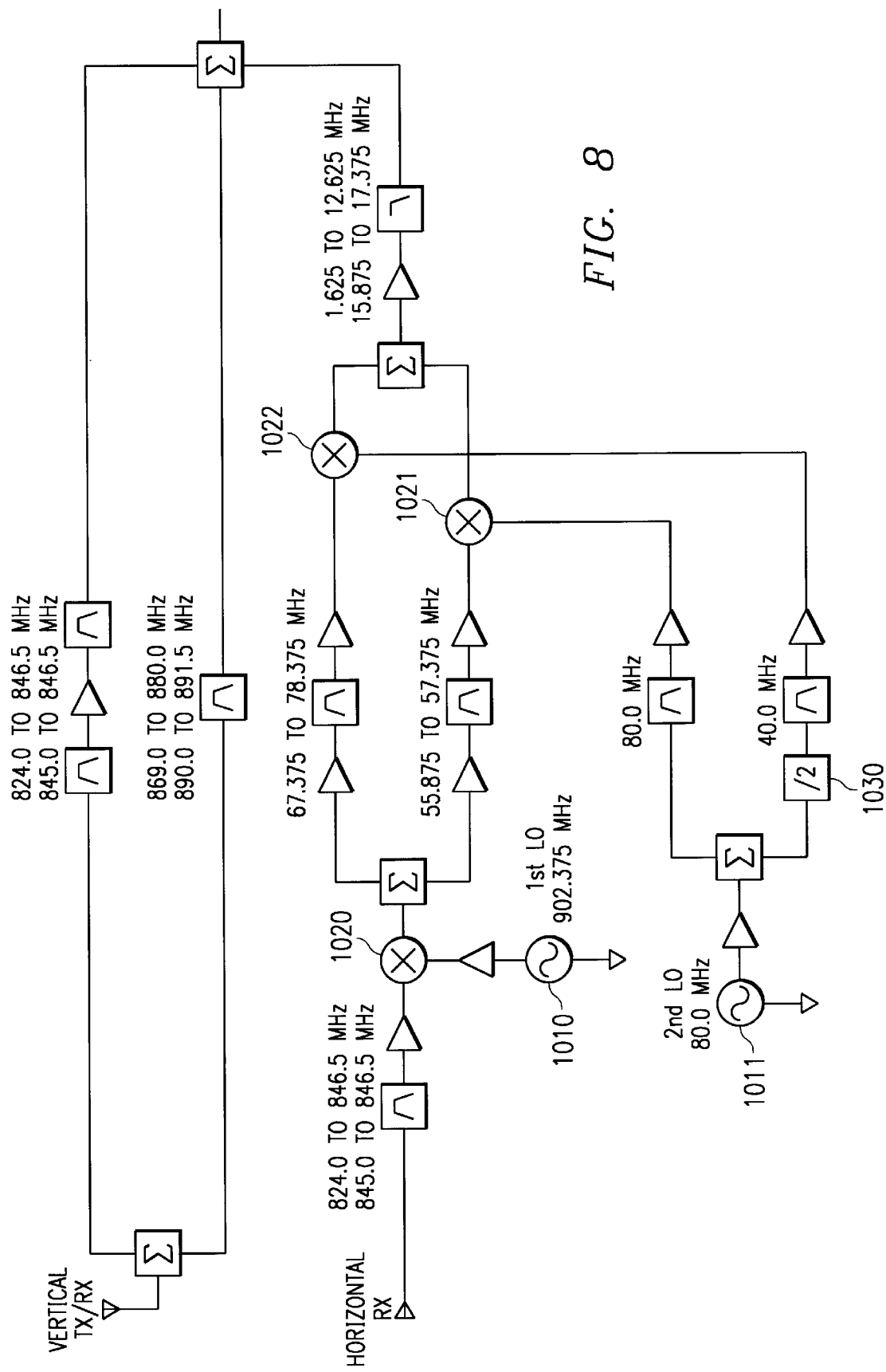

An alternative embodiment of down mixing circuitry utilized to combine antenna beam signals for transmission through a common signal path according to the present invention is shown in FIG. 8. This embodiment of down mixing circuitry provides down mixing in two stages utilizing LO 1010 in combination with mixer 1020 as a first stage and LO 1011 in combination with mixer 1021 and mixer 1022 as a second stage. It shall be appreciated that divider 1030 is utilized with LO 1011 and mixer 1022 to provide a different IF in a portion of the second stage down conversion than that of LO 1011 and mixer 1021. Accordingly, the antenna beam signal may be provided in two IFs. Of course, the use of two IFs may be omitted if desired, such as when a single LO is suitable for mixing down an RF signal to a signal of a desired frequency.

Although specific examples have been given herein utilizing receivers such as those found in cellular telephony applications, it should be appreciated that such specific examples are given to aid those of skill in the art better understand the concepts of the present invention. Accordingly, it is not intended that the present invention be limited to its use with cellular telephony receivers, digital communication equipment, cellular communication equipment, or even receivers. The principals of the present invention are useful with respect to any communication systems which may benefit from the use of signal diversity, including analogue cellular systems such as advanced mobile phone services (AMPS), in both the forward and reverse links of such communication equipment.

Additionally, although description has been given of the use of the present invention in three sectored communications systems, there is no such limitation to the operation of the present invention. For example, the present invention may be utilized to provide signal diversity in an omni directional system. Moreover, the present invention is not limited to any particular sector numbers or patterns, and may in fact be utilized to synthesize any sector shape, number, or orientation possible with the particular antenna beams provided by the antennas utilized. Likewise, the use of fixed orientation antenna beams is not a limitation of the present invention. The present invention may be utilized with many methods of providing wireless communication in selected areas, including the use of adaptive array antennas.

Although antenna systems utilizing angular diversity have been described above, it shall be appreciated that advantages of the present invention may also be realized through antenna systems adapted so as not to provide angular diversity. For example, a multiple beam sector may be adapted to provide four 120° overlapping beams according to the present invention. Signal diversity for such beams may be provided through the use of, for example, different polarization for each beam (i.e., left hand polarization for a first beam, vertical polarization for a second beam, right hand polarization for a third beam, and horizontal polarization for a fourth beam).

Although the present invention has been discussed with reference to reception of a transmitted signal, it shall be appreciated that the advantages of the present invention are equally advantageous for use in transmission of a signal. Systems for providing a signal to a plurality of antenna beams in the forward link are disclosed in the above referenced copending patent application Ser. No. 08/520,316, entitled "Narrow Beam Antenna Systems with Angular Diversity," and copending patent application Ser. No. 08/520,000, entitled "System and Method for Frequency Multiplexing Antenna Signals," each of which has been incorporated herein by reference.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for use in communicating signals between a plurality of communication devices, said system comprising:
   a communication device having at least a first signal port associated therewith adapted to communicate with antenna beam signals;
   a plurality of antenna beams including overlapping ones of said antenna beams, wherein ones of said antenna beams are adapted to communicate signals of a first polarization and other ones of said antenna beams are adapted to communicate signals of a second polarization;
   a first signal feed network coupling signals of a first set of signal beams of said plurality of antenna beams to said first signal port, wherein ones of said first set of antenna beams are selected to have said first polarization and other ones of said first set of signal beams are selected to have said second polarization, wherein adjacent antenna beams of said first set have alternate polarizations of said first and second polarizations.

2. The system of claim 1, wherein said first polarization is slant left polarization and said second polarization is slant right polarization.

3. The system of claim 1, wherein said first polarization is vertical polarization and said second polarization is horizontal polarization.

4. The system of claim 1, wherein said first polarization is right circular polarization and said second polarization is left circular polarization.

5. The system of claim 1, further comprising:
   a second signal feed network coupling signals of a second set of antenna beams of said plurality of antenna beams to a second signal port of said communication device, wherein ones of said second set of antenna beams are selected to have said first polarization and other ones of said second set of signal beams are selected to have said second polarization, wherein adjacent antenna beams of said second set have alternate polarizations of said first and second polarizations, and wherein ones of said first and second set of antenna beams overlap.

6. The system of claim 5, wherein said first signal port is a main communication port of said communication device and said second signal port is a diversity communication port of said communication device.

7. The system of claim 5, wherein said first signal feed network comprises an antenna beam signal management unit initially deployed for active service and said second signal feed network comprises an antenna beam signal management unit initially deployed for standby service.

8. The system of claim 5, wherein coupling of signals having said first polarization and said second polarization to said first and second signal port of said communication device by said first and second signal feed networks is accomplished in only a single link direction.

9. The system of claim 8, wherein said single link direction is a forward communication link.

10. The system of claim 8, wherein said single link direction is a reverse communication link.

11. The system of claim 8, wherein an opposite signal link direction utilizes antenna beams of said plurality of antenna beams having polarization of only one of said first and second polarizations.

12. The system of claim 1, wherein said plurality of antenna beams are narrow antenna beams of approximately 30° azimuthal width.

13. The system of claim 1, wherein said communication device is an AMPS radio.

14. The system of claim 1, wherein said communication device is a DAMPS radio.

15. The system of claim 1, wherein said communication device is a TDMA radio.

16. The system of claim 1, wherein said communication device is a CDMA radio.

17. A system for use in communicating signals between a plurality of communication devices, said system comprising:
   a communication device having at least a first and second signal port associated therewith;
   a plurality of signal beams including overlapping signal beams, wherein overlapping ones of said plurality of signal beams have signal diversity attributes;
   a first signal feed network coupling signals of a first set of signal beams of said plurality of signal beams to said first signal port, wherein ones of said first set of signal beams are selected to have a first signal diversity attribute of said signal diversity attributes and other ones of said first set of signal beams arc selected to have a second signal diversity attribute of said signal diversity attributes; and
   a second signal feed network coupling signals of a second set of signal beams of said plurality of signal beams to said second signal port, wherein ones of said second set of signal beams are selected to have said first signal diversity attributes of said signal diversity attributes and other ones of said second set of signal beams are selected to have said second signal diversity attributes of said signal diversity attributes.

18. The system of claim 17, wherein said first and second signal diversity attributes are orthogonal polarizations.

19. The system of claim 17, wherein said first signal port is a main signal port of said communication device and said second signal port is a diversity port of said communication device.

20. The system of claim 17, wherein said first signal feed network combines for coupling to said first signal port adjacent non-overlapping ones of said signal beams.

21. The system of claim 20, wherein adjacent ones of said non-overlapping ones of said signal beams combined by said first signal feed network have alternate ones of said first and said second signal diversity attributes.

22. The system of claim 21, wherein said first and second signal diversity attributes are different signal polarizations.

23. The system of claim 22, wherein said first signal diversity attribute is slant left polarization and said second signal diversity attribute is slant right polarization.

24. The system of claim 22, wherein said first signal diversity attribute is vertical polarization and said second signal diversity attribute is horizontal polarization.

25. The system of claim 22, wherein said first signal diversity attribute is right circular polarization and said second signal diversity attribute is left circular polarization.

26. The system of claim 17, wherein said first signal feed network comprises an antenna beam signal management unit initially deployed for active service and said second signal feed network comprises an antenna beam signal management unit initially deployed for standby service.

27. The system of claim 17, wherein ones of said signals of said signal beams having said second signal diversity attribute are combined for communication through a common signal path between antennas forming said signal beams and said communication device.

28. The system of claim 17, wherein ones of said signals of said signal beams having said first signal diversity attribute and ones of said signals of said signal beams having said second signal diversity attribute are combined for communication through a common signal path between antennas forming said signal beam and said communication device.

29. The system of claim 17, wherein coupling of signals having said first signal diversity attribute and said second signal diversity attribute to said first and second signal port of said communication device by said first and second signal feed networks is accomplished in only a single link direction.

30. The system of claim 29, wherein said single link direction is a forward communication link.

31. The system of claim 29, wherein said single link direction is a reverse communication link.

32. The system of claim 17, wherein said first set of signal beams includes contiguous signal beams and said second set of signal beams includes contiguous signal beams, and wherein the signal beams of said first set and the signal beams of said second set provide communication within a same area of service.

33. The system of claim 32, wherein said plurality of signal beams arc narrow antenna beams of approximately 30° azimuthal width.

34. The system of claim 17, wherein said communication device is an AMPS radio.

35. The system of claim 17, wherein said communication device is a DAMPS radio.

36. The system of claim 17, wherein said communication device is a TDMA radio.

37. The system of claim 17, wherein said communication device is a CDMA radio.

38. A communication system comprising:
an antenna array providing a plurality of antenna beams ones of which are disposed to provide corresponding pairs of antenna beams, said antenna array adapted for providing polarization diversity as among each antenna beam of a corresponding pair;
a first antenna beam signal path branch for coupling a first group of antenna beams of said plurality of antenna beams to a first interface, wherein said first branch is operable to select beams having alternating polarization for coupling to said first interface; and
a second antenna beam signal path branch for coupling a second group of antenna beams of said plurality of antenna beams to a second interface, wherein said second branch is operable to select beams having alternating polarization for coupling to said second interface, and wherein said ones of antenna beams of said second group are an antenna beam of a corresponding pair of antenna beams wherein another antenna beam of the corresponding pair of antenna beams is of said first group.

39. The system of claim 38, wherein said first and said second antenna beam signal path branches are adapted to provide substantially redundant communications with respect to each other to thereby provide continued operation of said communication system in the event of a failure of either one of said first and said second antenna beam signal path branches.

40. The system of claim 38, wherein said first antenna beam signal path branch comprises circuitry initially deployed as an active antenna beam signal path branch portion and said second antenna beam path branch comprises circuitry initially deployed as a standby antenna beam signal path branch portion.

41. The system of claim 38, wherein said antenna array comprises a plurality of multiple beam antenna panels each of which is adapted to provide a plurality of substantially non-overlapping antenna beams of at least one polarization of said polarization diversity.

42. The system of claim 41, wherein each multiple beam antenna panel of said plurality is also adapted to provide a plurality of substantially non-overlapping antenna beams of another polarization of said polarization diversity.

43. The system of claim 42 wherein said plurality of antenna beams of said at least one polarization and said plurality of antenna beams of said another polarization substantially overlap.

44. A method of providing communications within multiple antenna beams, said method comprising the steps of:
providing a plurality of antenna beams ones of which are disposed to provide corresponding pairs of antenna beams, wherein antenna beams of each corresponding pair of antenna beams are of orthogonal polarization;
coupling a first group of antenna beams of said plurality of antenna beams to a first interface including the step of selecting beams having alternating polarization for coupling to said first interface; and
coupling a second group of antenna beams of said plurality of antenna beams to a second interface including the step of selecting beams having alternating polarization for coupling to said second interface, wherein said ones of antenna beams of said second group are an antenna beam of a corresponding pair of antenna beams wherein another antenna beam of the corresponding pair of antenna beams is of said first group.

45. The method of claim 44, wherein said step of coupling said first group of antenna beams utilizes circuitry initially deployed as an active antenna beam signal path branch portion and said step of coupling said second group of antenna beams utilizes circuitry initially deployed as a standby antenna beam signal path branch portion.

46. The method of claim 44, further comprising the step of:
combining signals of said antenna beams having a same polarization for discrete communication through a common signal path portion between antennas forming said antenna beams and said first and said second interfaces.

47. The method of claim 44, further comprising the step of:
combining signals of said antenna beams of said first group of antenna beams for discrete communication through a common signal path portion between antennas forming said antenna beam and said first interface.

48. The method of claim 44, wherein said first interface is a main interface of a radio unit and said second interface is a diversity interface of said radio units.

49. The method of claim 44, wherein said first and said second interfaces are associated with a cellular telephony radio unit.

50. The method of claim 44, wherein said first and said second interfaces are associated with a personal communication services radio unit.

* * * * *